F. W. SIMONS.
TIRE ARMOR.
APPLICATION FILED FEB. 4, 1915.
1,166,861.
Patented Jan. 4, 1916.
2 SHEETS—SHEET 1.
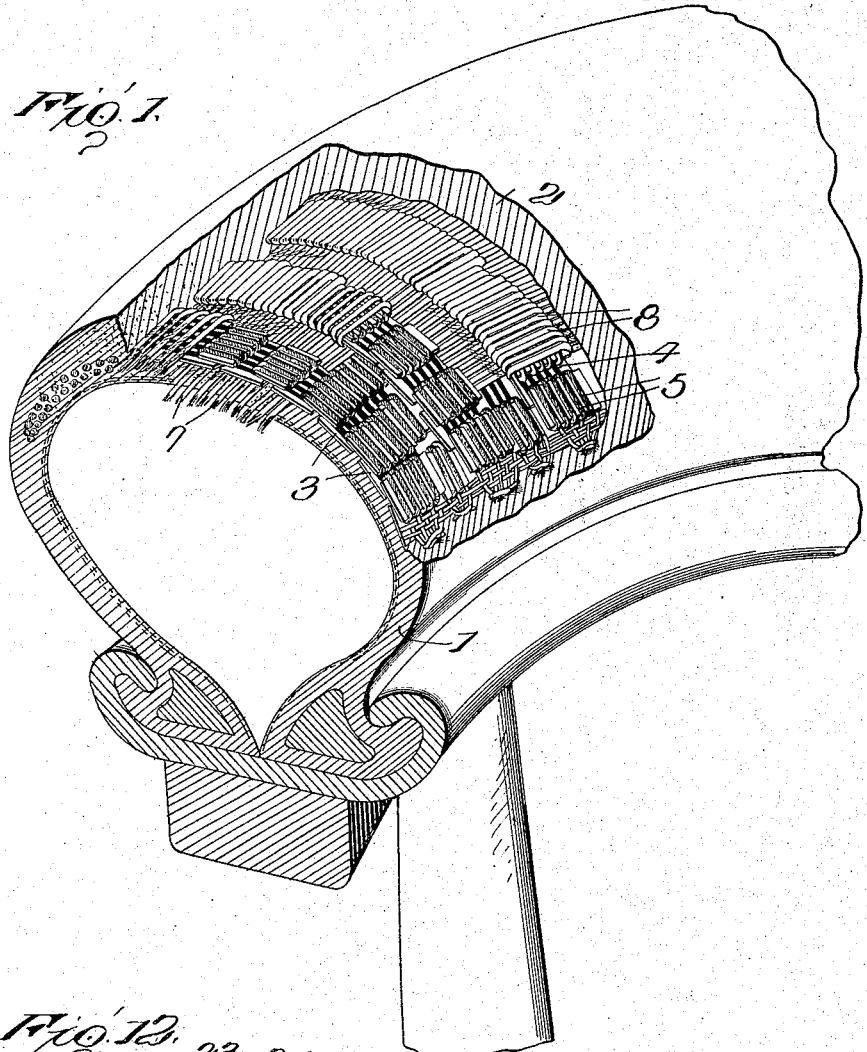
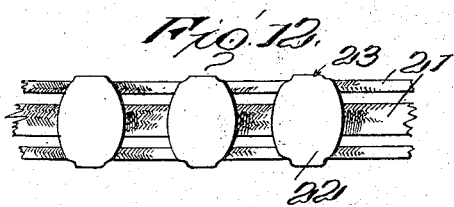
Witnesses
Inventor
F. W. Simons
By
Attorneys

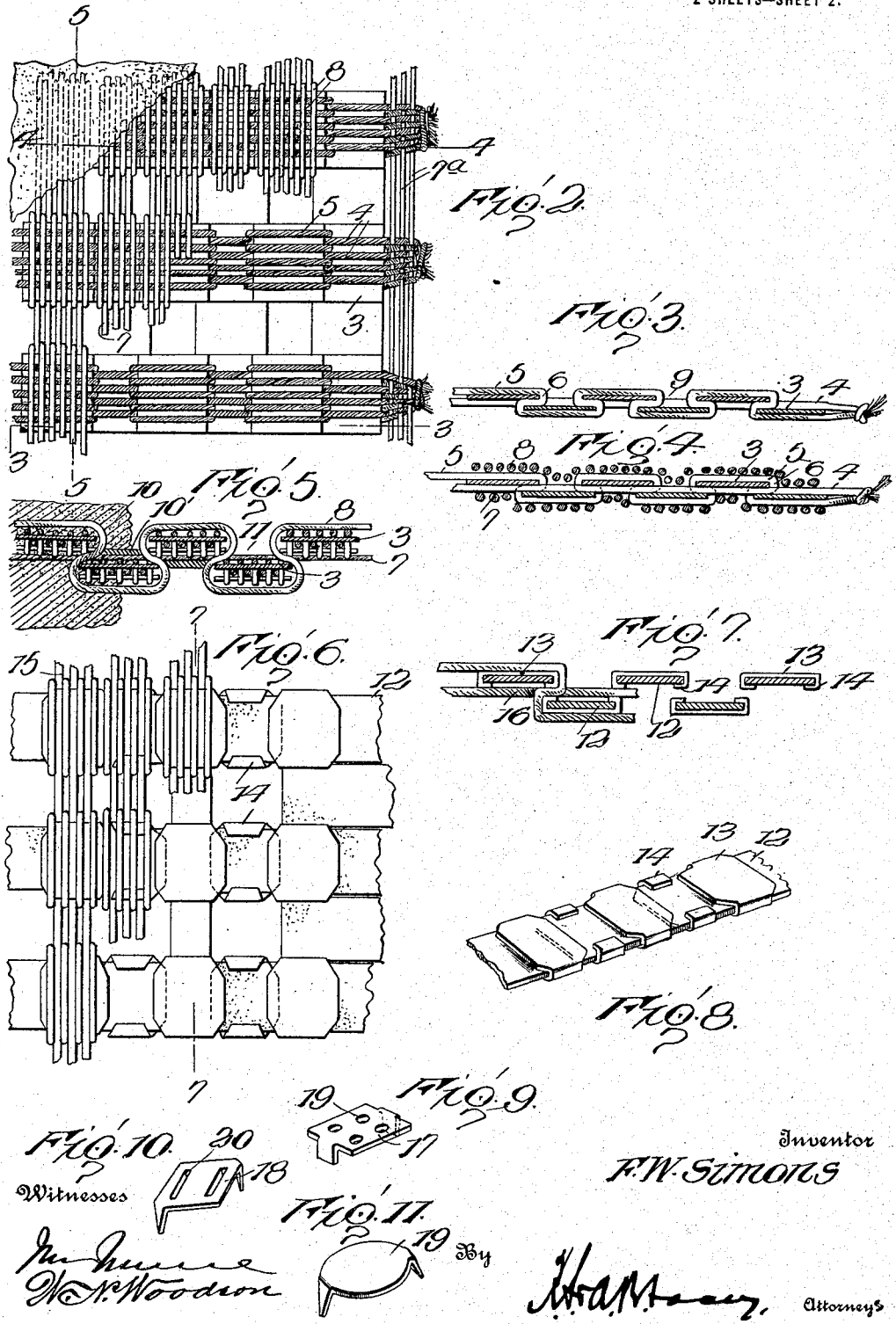

UNITED STATES PATENT OFFICE.

FRANK W. SIMONS, OF VALLEJO, CALIFORNIA.

TIRE-ARMOR.

1,166,861.  Specification of Letters Patent.  Patented Jan. 4, 1916.

Application filed February 4, 1915. Serial No. 6,100.

*To all whom it may concern:*

Be it known that I, FRANK W. SIMONS, a citizen of the United States, residing at Vallejo, in the county of Solano and State of California, have invented certain new and useful Improvements in Tire-Armor, of which the following is a specification.

This invention relates to tire armor and more particularly to that class of armor which is embedded in the body or tread of the tire casing. It has been proposed to provide tire armor consisting of armor plates or strips of metal which are embedded directly in the material comprising the tread of the tire casing, but this is wholly impractical as has been found by experience, inasmuch as the rubber of the tire casing will not adhere to the plates or strips, and as a consequence the said plates or strips in a short time cut through the tread and injure the same practically beyond repair. Furthermore, unless the plates or strips are arranged in overlapped relation, the tire is not effectually protected, inasmuch as nails or tacks or pieces of glass might cut through the tread of the tire casing at points between the edges of the plates or strips. Furthermore, if the plates are arranged in overlapping relation and embedded directly in the material of the tread, the frictional contact at their overlapped portions will cause them to become heated, thereby chafing the material of the tread and causing deterioration of the rubber comprising the same. Furthermore, unless the plates or strips are relatively large in width or diameter, it would not be practical to arrange them within the tread of the tire casing in uniform manner preparatory to the process of vulcanization, and if they are of relatively great diameter or width, the armor is not sufficiently flexible to render its use practical.

From the foregoing, it is obvious that if the tire armor of the class above briefly described is to prove practical it must possess the desired degree of flexibility; the armor plates or strips must be relatively small in diameter or width; the plates or strips must overlap in such manner as to present an unbroken layer of metal within the tread; and, some means must be provided for effectually and securely anchoring the plates or strips within the tread so as to prevent chafing of the rubber comprising the tread or cutting of the rubber. The present invention is designed to meet all of these requirements in a thoroughly efficient manner, and it aims further to so construct the armor that it may be quickly and readily applied, and, in fact, as easily as a canvas ply between the layers comprising the tread preparatory to the process of vulcanization.

In the accompanying drawings: Figure 1 is a perspective view of a portion of a tire, a part of the tread being removed to show the arrangement therein of the armor comprising the present invention. Fig. 2 is a fragmentary plan view of one form of the armor. Fig. 3 is a transverse sectional view on the line 3—3 of Fig. 2, certain of the strands being omitted for the sake of clearness. Fig. 4 is a similar view on the line 4—4 of Fig. 2. Fig. 5 is a circumferential sectional view on the line 5—5 of Fig. 2. Fig. 6 is a view similar to Fig. 2, illustrating a slight modification of the invention. Fig. 7 is a circumferential sectional view on the line 7—7 of Fig. 6. Fig. 8 is a perspective view of a portion of one of the transverse strips shown in Figs. 6 and 7. Fig. 9 is a perspective view of a slightly modified form of armor plate adapted for employment in the general structure shown in Figs. 6, 7 and 8. Fig. 10 is a similar view, illustrating another form of armor plate. Fig. 11 is a similar view, illustrating another modified form of armor plate. Fig. 12 is a plan view illustrating a modification of the structure shown in Fig. 8.

Corresponding and like parts are referred to in the following description and indicated in all the views of the accompanying drawings by the same reference characters.

The armor embodying the present invention may be molded in the tread of a new tire in the process of manufacture of the tire or it may be applied to a worn tire body in the process of vulcanizing a new tread thereto.

In Fig. 1 there is illustrated a portion of a vehicle tire, the casing of which is indicated by the numeral 1 and the tread of the casing by the numeral 2. The drawings, considered as a whole, illustrate two forms of the invention and in both instances the armor consists essentially of a number of transverse armor strips arranged in a longitudinal or circumferential series and woven together to form a continuous armor sheet. In that form of the invention shown in Figs. 2 to 5 inclusive, each of the armor strips comprises a number of preferably rectangular armor plates 3 which are of relatively small dimensions and these plates may be of metal or any other suitable material, as for example, compressed fiber possessing the desired degree of toughness. In the completed strips, the armor plates 3 are arranged in a staggered series with their lateral edge portions in overlapped but spaced relation as clearly shown in Fig. 3 of the drawings, and in the process of weaving or connecting these armor plates forming the series a number of transverse strands 4 of cord or tape or the like are passed between the upper and inner plates of the series and are stretched taut, it being observed by reference to Fig. 2 of the drawings that these strands 4 extend in spaced parallel relation with respect to each other and alternately transversely above and below the lower and upper ones of the plates respectively. In addition to the strands 4 other strands, indicated at 5, are interwoven with the plates comprising the series in a manner which will now be explained.

The strands 5 pass between or alternate with the strands 4 and by reference to Fig. 3 it will be observed that each strand 5 is passed about and beneath each lateral edge portion of each of the upper plates of the series as indicated at 6, and thence over, about and beneath the adjacent edge portions of the next adjacent lower plates of the series. It will now be apparent that when the strands 4 and 5 have been applied to the armor plates in the manner described and all are drawn taut, the armor plates will be securely anchored against the strands 4 in staggered and overlapped spaced relation, as above pointed out. The ends of the strands 4 and 5 of each armor strip may be united, as shown in Figs. 2, 3 and 4, either permanently or temporarily, and said ends of the strands extend a greater or less distance beyond the ends of the series of armor plates so as to provide means for anchoring the strips in the material of the tread of the casing in a manner which will be presently more fully explained.

In completing the armor sheet the required number of armor strips just described are laid in a transverse series in staggered relation with their edge portions overlapping, as clearly shown in Figs. 2 and 5 of the drawings, but with their said portions spaced so that the series comprises an upper set and a lower set of strips, and a number of strands of cord or tape, indicated at 7, are passed longitudinally in parallel relation to each other between the upper and lower sets comprising the series, and these strands correspond in function to the strands 4 of the individual armor members or strips. A number of strands of cord or tape, indicated at 8, are then woven back and forth in the same manner as are the strands 4 and 5 so that all of the armor strips are connected in a continuous series. By reference to Fig. 2 it will be observed that the strands 8 pass between the strands 6 and that said strands 7 and 8 intersect the strands 4 and 5 inasmuch as they extend longitudinally with respect to the plates 3 of the armor strips. It will also be observed by reference to the drawings, that certain of the strands 7, indicated specifically by the numeral 7ª, are interwoven with the projecting ends of the strands 4 and 5 so that a border 9 is provided extending longitudinally at each side of the armor sheet, as a whole, and throughout the entire length thereof. These woven borders serve as a means for anchoring or securing the side edge portions of the armor sheet in the material comprising the tread of the tire casing. It is preferable that in arranging the arm or strips to form the series, the upper and lower armor plates of adjacent strips be arranged in staggered relation. Thus, each plate of each armor strip will be in staggered relation to the two adjacent armor plates of the next adjacent strip on either side. To state this construction in other words, attention is called to the fact that between the adjacent lateral edges of each two adjacent armor plates at the upper or under side of each armor strip, there is a space, indicated at 9, such spaces being illustrated clearly in Fig. 3, and in arranging the strips in a series, each of these spaces will be closed at the front and rear by the armor plates of the next adjacent armor strips. Subsequent to the carrying out of the last described weaving process, strips 10′ of rubber and layers of soft rubber, indicated at 10, are applied to the upper and under sides of the armor sheet and the sheet is passed between compressing rolls which serve to force the layers of soft rubber into the spaces between the several strands 4, 5, 7 and 8, and to fill all of the interstices in the sheet as a whole with rubber. These layers of soft rubber will be pressed into and fill the spaces which occur between the armor strips themselves, which spaces are indicated in Fig. 5 by the numeral 11. It will further be understood by reference to the said Fig. 5, that the plates of the adjacent armor strips are spaced apart not only with respect to each other but as concerns the adjacent plates of adjacent strips, and these spaces also are more or less completely filled with soft rubber, during the rolling or compressing operation. It will now be understood that the strands 5 unite the plate of each armor strip in such a manner that the plates may have relative angular movement and as a consequence, each strip is in itself more or less flexible, the strands affording practically a hinge connection between the plates. It will furthermore be understood that the strands 8 serve exactly the same purpose in connecting the armor strips in a series, so that the armor sheet as a whole may be flexed transversely as well as longitudinally and may consequently be readily caused to conform to the transverse and circumferential curvature of the tire body. Further it will be apparent that a continuous and unbroken metallic armor sheet is provided, inasmuch as the plates of each armor strip overlap and the strips themselves overlap in the series, and consequently the armor sheet is impenetrable to the desired degree.

The modified structure shown in Figs. 6, 7 and 8 will now be described. In this structure, each of the armor members comprises a strip 12 of tape or other similar material, coated upon both sides with any suitable adhesive rubber composition, and a number of armor plates, indicated in general at 13, are secured to the strip in a series extending longitudinally thereof and alternately against the opposite sides of the strip so that the lateral edge portions of the plates will overlap in the series. In order that the plates may be so secured, the forward and rear ends of each plate are formed with tongues 14 which are clenched about the longitudinal edge portions of the strip. The strips or tapes 12 in this structure of course serve the same purpose as the strands 4 and 5 previously described, and in completing the armor sheet, the required number of the armor strips are assembled in overlapped relation, as shown in Figs. 6 and 7 and strands 15 and 16 of cord or tape are interwoven with the said strips so as to connect them in a longitudinal series. Layers of soft rubber are applied to the woven armor sheet thus formed in the same manner as to the armor sheet in Fig. 2.

Figs. 9, 10 and 11 illustrate modified forms of the armor plate 13 and the plates in these several figures are indicated respectively by the numerals 17, 18 and 19 and are respectively rectangular, lozenge shape, and elliptical. If desired, in order to lighten the plates and to provide for a more firm anchorage of the plates, any or all of the several forms may be formed with apertures, such as indicated at 19 in Fig. 9, or with slots, as indicated at 20 in Fig. 10.

A further modification of the individual armor strips is shown in Fig. 12, in which figure the numeral 21 indicates a series of parallel tapes of suitable length having applied thereto armor plates 22 having tongues 23 clenched about the said tapes. An inspection of Figs. 2 and 5 of the drawings will render it clear that the plates are more or less completely covered by the intersecting and interwoven uniting strands and as the plates are held in proper relative positions by these strands and the rubber of the tire body will firmly adhere to the strands, displacement of the several plates is rendered unlikely as also their frictional contact and consequently there will be little or no tendency for the armor to become displaced within the tread of the tire.

If desired the armor strips may be arranged to extend circumferentially of the tire and may be flexibly connected in this relation by any suitable means.

Having thus described the invention, what is claimed as new is:

1. Tire armor including a series of armor strips, each comprising a series of overlapped armor plates, flexible strands interwoven with the plates, and flexibly connecting the same, and means flexibly connecting the strips of the series.

2. Tire armor including a series of armor strips, each strip comprising a series of armor plates arranged in staggered relation with their adjacent edge portions spaced and overlapped, flexible elements extending between the sets of armor plates, flexible elements interwoven with the armor plates of the series, and means flexibly connecting the strips of the series.

3. Tire armor including a series of armor strips, each strip comprising a series of armor plates arranged in staggered relation with their adjacent edge portions spaced and overlapped, flexible elements extending between the sets of armor plates, flexible elements interwoven with the armor plates of the series, and flexible elements interwoven with the strips and flexibly connecting the strips in the series.

4. Tire armor including a series of armor members arranged in sets in staggered overlapped relation, flexible elements extending between the sets of the series, flexible elements interwoven with the members in the sets, and a cushioning substance filling the spaces and interstices between the plates and the said flexible elements.

5. Tire armor including a series of armor strips, each strip comprising a series of armor plates, flexible elements interwoven with the armor plates of each series and at their ends extending beyond the series of armor plates, means flexibly connecting the armor strips of the series, and flexible elements connecting the projecting ends of the first mentioned flexible elements at each side of the armor.

6. Tire armor including a series of armor strips, each of the armor strips comprising a series of armor plates, flexible strands interwoven with the armor plates of each series whereby to flexibly connect the same, the said strands at their ends extending beyond the end plates of the respective series and united at their extremities, means flexibly connecting the series of armor strips, and flexible strands interwoven with the extended ends of the first mentioned strands.

In testimony whereof I affix my signature in presence of two witnesses.

FRANK W. SIMONS. [L. S.]

Witnesses:
 JAMES V. O'HARA,
 R. J. R. ADEN.